United States Patent [19]

DuLac et al.

[11] Patent Number: 5,163,132
[45] Date of Patent: Nov. 10, 1992

[54] INTEGRATED CONTROLLER USING ALTERNATELY FILLED AND EMPTIED BUFFERS FOR CONTROLLING BI-DIRECTIONAL DATA TRANSFER BETWEEN A PROCESSOR AND A DATA STORAGE DEVICE

[75] Inventors: Keith B. DuLac, Derby; Bret S. Weber, Wichita, both of Kans.

[73] Assignee: NCR Corporation, Dayton, Ohio

[21] Appl. No.: 363,352

[22] Filed: Jun. 6, 1989

Related U.S. Application Data

[63] Continuation of Ser. No. 100,699, Sep. 24, 1987, abandoned.

[51] Int. Cl.⁵ .............................................. G06F 3/00
[52] U.S. Cl. .............................. 395/275; 364/248.1; 364/239.1; 364/239.51; 364/239.6; 364/DIG. 2; 395/325
[58] Field of Search ..................... 395/275, 325, 250

[56] References Cited

U.S. PATENT DOCUMENTS

| | | | |
|---|---|---|---|
| 3,761,894 | 9/1973 | Pilc | 364/200 |
| 3,764,986 | 10/1973 | Spademan | 364/200 |
| 3,772,657 | 11/1973 | Marsalka | 364/200 |
| 4,032,898 | 6/1977 | Grigoletti | 364/200 |
| 4,131,940 | 12/1978 | Moyer | 364/200 |
| 4,137,562 | 1/1979 | Boeck et al. | 364/200 |
| 4,149,242 | 4/1979 | Pirz | 364/200 |
| 4,200,928 | 4/1980 | Allan et al. | 364/200 |
| 4,333,143 | 6/1982 | Calder | 364/200 |
| 4,348,761 | 9/1982 | Berger | 364/200 |
| 4,399,503 | 8/1983 | Hawley | 364/200 |
| 4,417,304 | 11/1983 | Dinwiddle | 364/200 |
| 4,460,959 | 7/1984 | Lemay et al. | 364/200 |
| 4,486,833 | 12/1984 | Daudelin | 364/200 |
| 4,517,641 | 5/1985 | Pinheiro | 364/200 |
| 4,543,626 | 9/1985 | Bean et al. | 364/200 |
| 4,667,286 | 5/1987 | Young | 364/200 |
| 4,716,525 | 12/1987 | Gilanyi et al. | 364/200 |
| 4,744,078 | 5/1988 | Kowalczyk | 364/200 |

*Primary Examiner*—Thomas C. Lee
*Assistant Examiner*—Eric Coleman
*Attorney, Agent, or Firm*—Gregory P. Gadson

[57] ABSTRACT

The present invention couples a disk drive to a small computer system interface bus by means of two buffers connected between a buffer-in bus and a buffer-out bus to allow data to be read out from a first filled buffer onto the buffer-out bus, while simultaneously permitting a filling of the second buffer from the buffer-in bus. When the second buffer is full and the first buffer is empty, the second buffer may be read while the first buffer is again filled. Toggling between the two buffers continues until the required data transfer is complete.

7 Claims, 2 Drawing Sheets

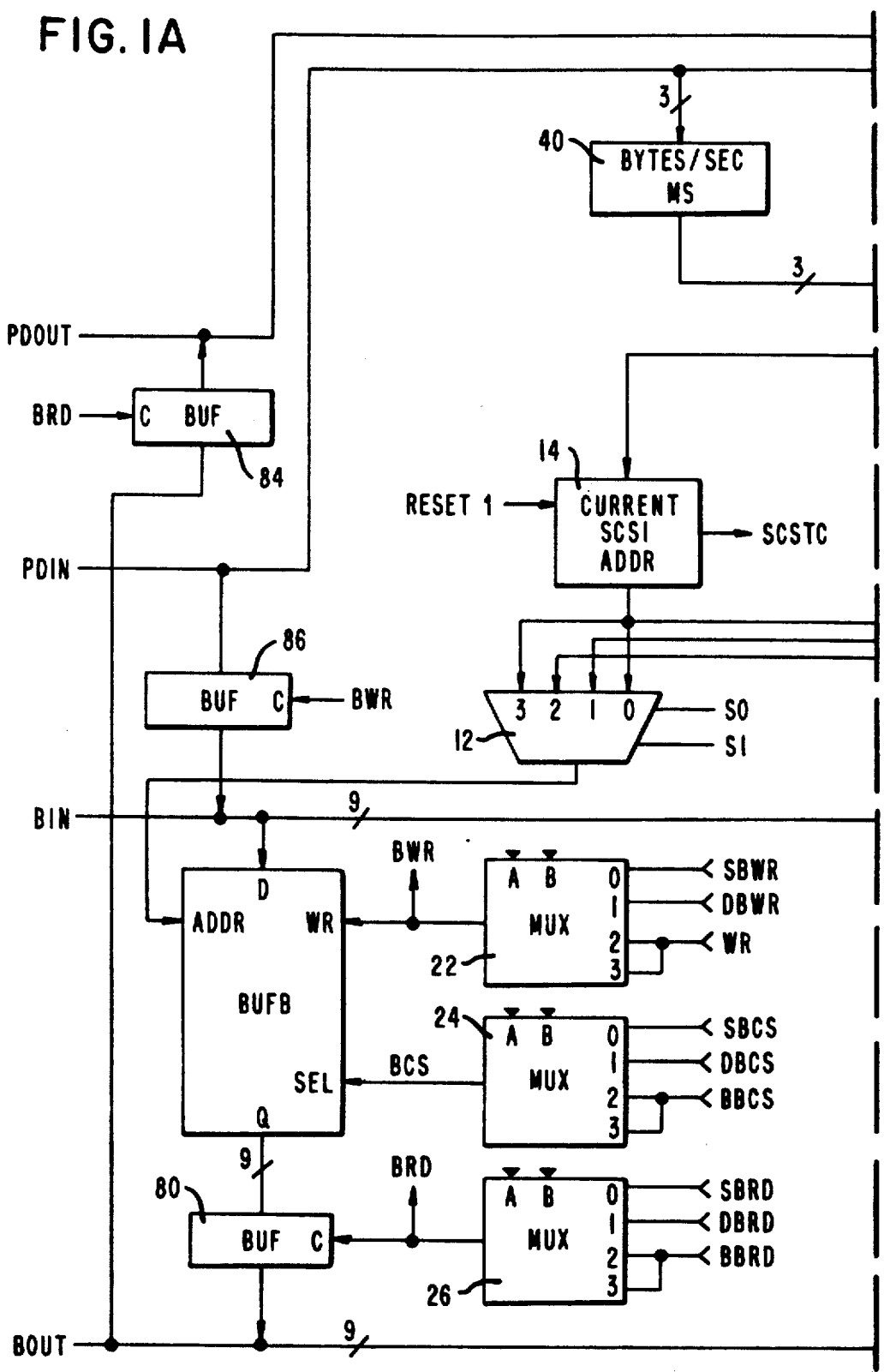
FIG. IA

INTEGRATED CONTROLLER USING ALTERNATELY FILLED AND EMPTIED BUFFERS FOR CONTROLLING BI-DIRECTIONAL DATA TRANSFER BETWEEN A PROCESSOR AND A DATA STORAGE DEVICE

This is a continuation of co-pending application Ser. No. 100,699 filed on Sep. 24, 1987, now abbandoned.

BACKGROUND OF THE INVENTION

The present invention is related generally to data processing systems and more particularly to a multiple buffer control system for controlling data transfers between disk drives and bus connected processors.

With the recent growth in the interconnection of personal and business minicomputers through a system bus there has developed a need to control, record, and retrieve digital data from magnetic media, particularly disks. Generally speaking, a system is comprised of a microprocessor, disk drive and a disk controller, with the microprocessor having its own data and address bus connected to the disk controller. The disk controller is connected to the disk drive by a controller bus. Some systems may also utilize a disk drive that is connected to the controller by a state machine. In such systems, data read from the disk passes through the state machine and onto the controller bus. The state machine normally performs a number of functions such as receiving data in parallel format, storing the data so that it can be directed to the disk in serial format, translating protocols and controlling the direction of data flow. Groups of dedicated buffers are generally used in such systems to handle input data and output data.

To maintain an acceptable degree of processing speed, input buffers and output buffers are interjected between the slow disk drives and the high speed processors. Each of these buffers are unidirectional in that it handles either incoming or outgoing data only. Such systems can use only half of the data buffers at one time, i.e., either the incoming buffers or the outgoing buffers.

SUMMARY OF THE INVENTION

The present invention utilizes a pair of buffers that are interconnected between an input bus and an output bus. Each buffer is steerable to receive either disk data or system bus data. Multisector disk reads and writes are accommodated quickly by filling one buffer, and while that buffer is being read, filling the other buffer with the alternate filling and reading process continuing until the data transfer is complete. The buffers are bi-directional, therefore, only half the number of buffers are required as when unidirectional buffers are used.

More specifically, in the preferred embodiment of the invention there is provided a multiple buffer controller having an input buffer bus, an output buffer bus, and a first and a second storage buffer each having inputs connected to the input buffer bus and having outputs connected to the output buffer bus.

A means for addressing the second storage buffer is provided to direct the storage and retrieval of data from the first storage buffer. A means for addressing the second storage buffer is also provided to direct the storage and retrieval of data from the second storage buffer.

A means is coupled to the first and the second storage buffer for toggling the first and the second storage buffer such that when one of the buffers is being filled with data, the other of the buffers is being emptied of data and when the buffers are filled and emptied, respectively, the buffers are toggled such that the empty buffer commences filling and the filled buffer commences emptying.

From the foregoing it can be seen that it is a primary object of the present invention to provide a buffer controller for increasing the speed of data transfer between a data processor and a disk drive.

It is another object of the present invention to provide a buffer control system which uses a minimum number of buffers to transfer data between a data processor and a disk drive.

These and other objects of the present invention will become more apparent when taken in conjunction with the following description and drawings wherein like characters indicate like parts and which drawings form a part of the present specification.

BRIEF DESCRIPTION OF THE DRAWINGS

FIGS. 1A and 1B, taken together, illustrate in schematic block diagram form the preferred embodiment of the invention.

DESCRIPTION OF THE PREFERRED EMBODIMENT

Figure 1B:
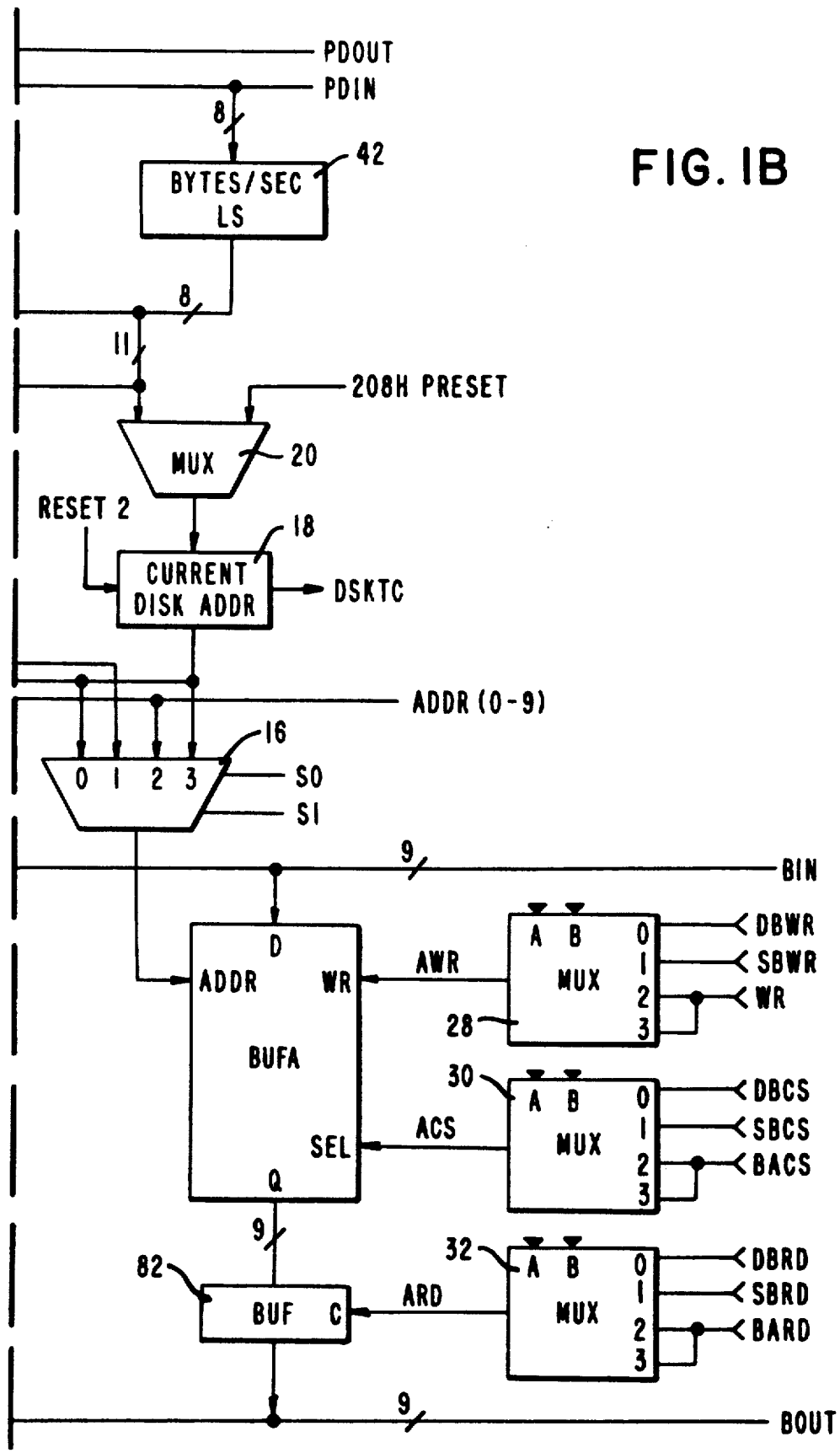

Referring to FIGS. 1A and 1B, two 521 byte buffers, labeled A and B, are connected between an input bus BIN and an output bus BOUT. Each buffer can be addressed with one of three different groups of addresses: the address appearing on a small computer interface (SCSI) bus; the disk address; or the processor address (ADDR(0-9)).

A 4-to-1 multiplexer 12, under control of selection signals S0 and S1, selects one of the three signals on its inputs and directs the selected signal to the ADDR input of the B buffer. In a like manner, a 4-to-1 multiplexer 16, under control of the selection signals S0 and S1, selects one of the three signals on its inputs to be sent to the ADDR input of the A buffer. Each buffer has write/read, data in, data out, address, and chip select inputs, labeled WR, D, Q, ADDR, and SEL, respectively.

Three 4-to-1 multiplexers 22, 24 and 26 receive at their inputs a group of steering signals SBWR, DBWR, WR; SBCS, DBCS, BBCS; and SBRD, DBRD, BBRD, respectively, and provide at their respective outputs the signals BWR, BCS and BRD. Selection inputs labeled A and B determine which inputs are selected.

The output signal BWR, from multiplexer 22, is directed to the WR input of buffer B and to the enabling input C of a buffer 86. Buffer 86 operates to couple data between a PDIN bus and the BIN bus. The PDIN bus and the PDOUT bus are used to couple a local processor (not shown) to the system without having to go over the SCSI bus.

The output signal BCS, from multiplexer 24, is directed to the SEL input of buffer B to select buffer B when one of the signals SBCS, DBCS or BBCS is active and selected by the multiplexer 24.

The output signal BRD, from multiplexer 26, is directed to the enable input C of a buffer 84 when one of the signals SBRD, DBRD or BBRD is active and selected by the multiplexer 26. Buffer 84 operates to couple data between the BOUT bus and the PDOUT bus.

In the write mode for buffer B, data received on the BIN bus is loaded into the buffer at an address determined by the bit signals at the ADDR input. A base or offset address may be established with an 11-bit signal applied to the PDIN bus. The eight least significant bits of the base address are directed to a bytes/sec LS buffer 42. The three most significant bits of the base address are directed to the bytes/sec MS buffer 40. Depending on the formatting being used for the recording of data onto the disk, the least significant bytes of the number of bytes per sector are outputted as 8-bits to one input of a 2-to-1 multiplexer 20. The most significant 3 bits, corresponding to the number of bytes per sector, are outputted from buffer 40 to an input to the multiplexer 20. The cumulative 11-bit output from buffers 40 and 42 is directed also to a current SCSI address counter 14. The counter responds to the 11-bit input to provide a base address to the ADDR input of buffer B when the multiplexer 12 is enabled by the signals S0 and S1 to select either the 0 or the 3 labeled input. The address counter 14 is incremented at the completion of each byte transfer constituting a read or a write. This process continues until the address counter 14 reaches its terminal count according to the number of bytes contained in a sector. Upon reaching a terminal count, a signal SCSTC is outputted by the address counter 14 indicating that a sector transfer has been completed. The maximum number of bytes per sector that may be used in the preferred embodiment shown is 521 decimal (limited by the size of buffers A and B). The address counter 14 may be reset by the signal RESET 1.

The multiplexer 20, under control of a selection signal (not shown), may select either the 11-bit address signal from the bytes per sector buffers 40 and 42 or the hex signal 208H PRESET. In the preferred embodiment of the invention the hex signal is used to load formatting data into the A buffer. A current disk address counter 18 receives the output signal from the multiplexer 20 and like the current SCSI address counter 14, sets its count to the received bits to provide at its output the base address signal. The base address signal is applied to the address input ADDR of buffer A when either input 0 or 3 of the 4-to-1 multiplexer 16 is selected by the selection signals S0 and S1. The disk address can alternately be directed to the B buffer when the input 1 of the multiplexer 12 is selected. The multiplexers 12 and 16, at the inputs labeled 2, receive an address signal ADDR(0-9) comprised of 10-bits, from a data control port (not shown) for loading or reading out one block of format information from the PD buses. The ADDR (0-9) signals do not form a part of the present invention.

The A buffer is controlled by the signals AWR, ACS and ARD appearing at the inputs labeled WR, SEL, and C respectively. These signals are received from the outputs of 4-to-1 multiplexers 28, 30 and 32, respectively. Multiplexers 28, 30 and 32 function similarly to multiplexers 22, 24 and 26, utilizing the same input signals except for the signals BBCS, BBRD, BACS and BARD. The aforementioned signals are applied to the number 2 and 3 inputs of multiplexers 24, 26, 30 and 32 to provide for the individual selection of buffer A or buffer B without entering the alternate mode of filling one buffer while emptying the other. The non alternate mode of operation provides flexibility to the use of the present invention. The signal WR applied to the inputs numbered 2 and 3 of multiplexers 22 and 28, permits either buffer to be individually written or read based on the presence of an enabling signal on the SEL input. The signals on the inputs 0 and 1 of multiplexers 22 and 28 are reversed from each other, and in a like manner, the signals on inputs 0 and 1 of multiplexers 24 and 30 are also reversed such that the multiplexers responding to the signals on their inputs provide the toggling action that permits one buffer to be filled while the other is being emptied.

A buffer 82 couples the 9-bit data signal from the Q-output of buffer A to the BOUT bus when the signal ARD is active (buffer A read).

A buffer 80 couples the 9-bit data signal from the Q-output of buffer B to the BOUT bus when the signal BRD is active (buffer B read).

Although a number of input signals are shown at the inputs of multiplexers 22, 24, 26, 28, 30 and 32 (compliance with the best mode requirement), it will be understood by persons skilled in the art that a lesser number of signals may be used to accomplish the function of the present invention.

The following is a description of how the system operates with a simultaneous multisector disk read and write operation to, for example, a data controller coupled to a small computer system interface (SCSI).

When disk data is ready, the current disk address counter 18 is reset to the starting address by the RESET 2 input signal and the multiplexer 16 is set such that the address signal appears on the ADDR input to buffer A. The signal AWR, derived from either the selection of the signal SBWR or WR, is placed in the write state and the signal ACS is placed in the chip select state by either signal DBCS, SBCS or BACS, dependent on the state of the signals applied to the selection inputs A and B of the multiplexer 30. When buffer A is filled with one sector of data the current disk address counter emits the disk terminal count signal DSKTC.

The disk terminal count signal DSKTC causes the current SCSI address counter to now be coupled to the ADDR input of buffer A by the multiplexer 16 coupling its output to its number 1 input. The output of the current disk address counter 18 is then coupled to the ADDR input to buffer B by the multiplexer 12 coupling its output to its number 1 input. The current disk address counter 18 is reset by the RESET 2 signal and disk data is now loaded into buffer B.

Simultaneously, the disk data previously loaded into buffer A is now read out of buffer A by enabling; the read input with the signal AWR, the SEL input with the signal ACS and the buffer 82 with the signal ARD. This reading and writing process continues until all of the sectors of disk data that have been transferred to the SCSI connected data controller. When data is to be transferred from the SCSI connected device to the disk the current SCSI address counter provides the addresses to the buffers A and B and the data is loaded and unloaded in an identical manner as the disk read and SCSI write previously discussed. The common BIN/BOUT structure allows data to be read from buffer A and written to buffer B, simultaneously and vice versa.

While there has been shown what is considered to be the preferred embodiment of the invention, it will be manifest that many changes and modifications may be made therein without departing from the essential spirit of the invention. It is intended, thereof, in the annexed claims, to cover all such changes and modifications that may fall within the true scope of the invention.

We claim:

1. A multiple buffer controller for controlling bi-directional data transfer between a processor and a data storage device comprising:

a bi-directional input buffer bus coupled both to said processor and said data storage device;

a bi-directional output buffer bus coupled both to said processor and said data storage device;

a first and second storage buffer each having inputs coupled to said input buffer bus and having outputs coupled to said output buffer bus;

means for addressing said first storage buffer to direct the storage and retrieval of data from said first storage buffer;

means for addressing said second storage buffer to direct the storage and retrieval of data from said second storage buffer; and means coupled to said first and second storage buffer for toggling said first and said second storage buffer such that when one of said buffers is being filled with data, the other of said buffers is being emptied, respectively, said buffers are toggled such that the empty buffer commences filling and the filled buffer commences emptying wherein transfer of data from the processor to the data storage and data transfer from the data storage to the processor can be performed via said first and second storage buffers.

2. The multiple buffer controller according to claim 1 wherein:

said first and said second storage buffers each has a write/read enable input for receiving two state signals, one state of which permits data on said input buffer bus to be stored in the buffer receiving the one state enabling signal and the other state of which permits the reading out of data stored in the buffer receiving the other state enabling signal and each having a select input for receiving a select signal when the buffer is to be activated for writing or reading and further comprising:

means for steering complementary signals to the write/read enable inputs of said first and said second storage buffers such that one buffer is write enabled when the other buffer is read enabled; and means for addressing said buffers for writing in and for reading out data.

3. A multiple buffer controller for controlling bi-directional data transfer between a processor and a data storage comprising:

a bi-directional input buffer bus coupled both to said processor and said data storage device;

a bi-directional output buffer bus coupled both to said processor and said data storage device;

a first and second storage buffer for storing blocks of data, each having data inputs coupled to said input buffer bus and having outputs coupled to said output buffer bus;

a first and second address multiplexer having a first input for receiving a source address and a second input for receiving a destination address and a selection input for receiving a signal for selecting the signal on said first or said second input to appear at the output of said multiplexer;

a first address a counter having output coupled to the first input of said first address multiplexer and to the second input of said second address counter;

a second address counter having an output coupled to the second input of said first address multiplexer and to the first input of said second address counter;

means coupled to the input of said first and second address counter for providing an initial address and an incremental number of additional addresses corresponding to the number of bytes in one block of data and control means for selecting said first and second storage buffers and said first and said second address multiplexers, such that a block of data is written into said first buffer over said input buffer bus and is read out on said buffer bus as a second block of data is written into said second buffer over said input buffer bus as the first block of data is read from said first buffer wherein said transfer of data from the processor to the data storage and data transfer from the data storage to the processor can be performed via said first and second storage buffers.

4. The multiple buffer controller according to claim 3 wherein said first and said second address counters each independently outputs a terminal count signal when the number of addresses corresponding to a block of data have been incremented and further comprising:

toggling means responsive to the existence of said terminal count for initiating a read operation from the buffer having received a block of data.

5. The multiple buffer controller according to claim 3 and further comprising:

a first and a second buffer interposed between the outputs of said first and said second storage buffers, respectively, and said output buffer bus for temporarily storing the data read from said first and said second storage buffers.

6. The multiple buffer controller according to claim 3 and further comprising:

a data control input bus;

a data control output bus;

a first data buffer coupled between said input buffer bus and said data control input bus;

a second data buffer coupled between said output buffer bus and said data control output bus; and means for selecting said first data buffer when data is to be written on said input buffer bus and for selecting said second data buffer when data is to be read from said output buffer bus.

7. The multiple buffer controller according to claim 6 wherein said first and said second address multiplexers each has a third input for receiving a data control address for directing data from said data control input bus and to an enabled storage buffer and from an enabled storage buffer to said data control output bus.

* * * * *